United States Patent
Lee et al.

(10) Patent No.: US 12,496,542 B2
(45) Date of Patent: Dec. 16, 2025

(54) ANTIBACTERIAL OR ANTIVIRAL FILTER HAVING IMPROVED COATING DURABILITY AND UV DURABILITY

(71) Applicant: KOREA INSTITUTE OF MATERIALS SCIENCE, Changwon-si (KR)

(72) Inventors: Seung-hoon Lee, Changwon-si (KR); Sunghoon Jung, Changwon-si (KR); Dogeun Kim, Seoul (KR); Jooyoung Park, Changwon-si (KR); Eunyeon Byeon, Changwon-si (KR); Junyeong Yang, Changwon-si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 0 days.

(21) Appl. No.: 17/785,997

(22) PCT Filed: Dec. 10, 2021

(86) PCT No.: PCT/KR2021/018779
§ 371 (c)(1),
(2) Date: Jun. 16, 2022

(87) PCT Pub. No.: WO2023/106471
PCT Pub. Date: Jun. 15, 2023

(65) Prior Publication Data
US 2024/0307806 A1  Sep. 19, 2024

(30) Foreign Application Priority Data
Dec. 9, 2021  (KR) .................... 10-2021-0175350

(51) Int. Cl.
*B01D 39/16*  (2006.01)

(52) U.S. Cl.
CPC .. *B01D 39/1623* (2013.01); *B01D 2239/0442* (2013.01); *B01D 2239/0471* (2013.01); *B01D 2239/10* (2013.01)

(58) Field of Classification Search
CPC ..................................................... A61D 13/11
See application file for complete search history.

(56) References Cited

U.S. PATENT DOCUMENTS

| | | | | |
|---|---|---|---|---|
| 5,900,443 A | * | 5/1999 | Stinnett | B29C 59/16 522/163 |
| 2021/0322908 A1 | * | 10/2021 | Gopal | B32B 5/269 |
| 2022/0007754 A1 | * | 1/2022 | Kaiserman | A41D 31/145 |

FOREIGN PATENT DOCUMENTS

| | | |
|---|---|---|
| JP | 1997-049170 | 2/1997 |
| JP | 2002327267 A * | 11/2002 |

(Continued)

OTHER PUBLICATIONS

Koh (Surface Modification of Polytetrafluoroethylene by Ar+ Irradiation for Improved Adhesion to Other Materials, 1996) (Year: 1996).*

(Continued)

*Primary Examiner* — Bradley R Spies
*Assistant Examiner* — Jeannie McDermott
(74) *Attorney, Agent, or Firm* — LEX IP MEISTER, PLLC

(57) ABSTRACT

Provided is an antibacterial or antiviral filter having improved coating durability and UV durability. More particularly, a polymer filter which may express an antibacterial or antiviral function having both improved coating durability of various filter materials and improved UV durability, and a method of manufacturing the same are provided.

10 Claims, 14 Drawing Sheets

(56) References Cited

FOREIGN PATENT DOCUMENTS

| JP | 2010-524515 | | 7/2010 | |
|----|-------------|---|--------|---|
| KR | 20060025500 | * | 6/2006 | ......... C23C 14/3442 |
| KR | 10-0764045 | | 10/2007 | |
| KR | 2009-0051455 | | 5/2009 | |
| WO | 2018187782 | | 10/2018 | |

OTHER PUBLICATIONS

Huang, et al., Metallic coloration on polyester fabric with sputtered copper and copper oxides films, 2020, Vacuum, 178. (Year: 2020).*

* cited by examiner

FIG. 7

Concentration of Inoculation Bacteria : $1.2 \times 10^5$ CFU/mL

| | | Control group | Normal mask | Antibacterial treatment mask |
|---|---|---|---|---|
| | Contact time | 24h | 24h | 24h |
| Staphylococcus aureus (ATCC 6538) | Number of bacterium after contact | $8.4 \times 10^7$ | $9.9 \times 10^7$ | $9.3 \times 10^2$ |
| | Bacteria reduction rate(%) | - | 0.0 | 99.9 |
| | Result photograph | 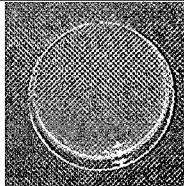 | 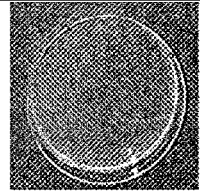 | 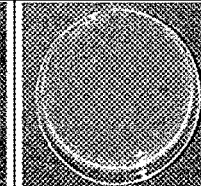 |

Concentration of Inoculation Bacteria : $1.4 \times 10^5$ CFU/mL

| | | Control group | Normal mask | Antibacterial treatment mask |
|---|---|---|---|---|
| | Contact time | 24h | 24h | 24h |
| Klebsiella pneumoniae (ATCC 4352) | Number of bacterium after contact | $1.5 \times 10^8$ | $9.4 \times 10^7$ | <1 |
| | Bacteria reduction rate(%) | - | 36.4 | 99.9 |
| | Result photograph |  | 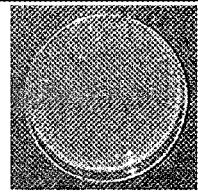 | 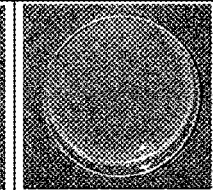 |

Virus 10⁻⁵ 500ul per 60mm Dish

ANTIBACTERIAL OR ANTIVIRAL FILTER HAVING IMPROVED COATING DURABILITY AND UV DURABILITY

TECHNICAL FIELD

This disclosure relates to an antibacterial or antiviral filter having improved coating durability and UV durability. More particularly, this disclosure relates to a polymer filter which may express an antibacterial or antiviral function having both improved coating durability of various filter materials and improved UV durability, and a method of manufacturing the same.

BACKGROUND ART

Recently, the use of air cleaners, masks, and the like becomes important and routinized due to intensification of fine dust and the threat of various viruses. The air cleaners, the air conditioning equipment, the water purifiers, the masks, and the like have an antibacterial or antiviral filter which may remove various bacteria, fungi, viruses, and the like.

The antibacterial or antiviral filter has an antibacterial or antiviral material which may collect and remove bioparticles such as various bacteria, fungi, and viruses. Usually, the antibacterial or antiviral material is activated carbon, metal, metal oxides, artificial enzyme catalyst (Cu-phthalocyanine), and the like, and has been applied on a fiber and the like which is a filter material to be manufactured into an antibacterial or antiviral filter.

Since it is not easy to coat the fiber and the like with an antibacterial material adhesively, and even when the fiber and the like are coated with the antibacterial material, the antibacterial material is easily released from the fiber and the like, the antibacterial or antiviral filter often has poor coating durability. In particular, polytetrafluoroethylene (hereinafter, referred to as PTFE) has low adhesive strength with any coating, and thus, it is difficult to secure coating durability.

Therefore, it is very important for the antibacterial or antiviral filter to have improved adhesive strength between a fiber which is a filter material, in particular, PTFE and the like and an antibacterial or antiviral material.

In addition, when a polymer filter is used as a material of the antibacterial or antiviral filter, polymer may be cured by ultraviolet rays to be damaged, and thus, a filter having both improved coating durability and improved UV durability is needed.

As the background art of this disclosure, Japanese Patent Laid-Open Publication No. 1997-049170 discloses an antibacterial fiber product and a manufacturing method thereof.

DISCLOSURE

Technical Problem

An object of this disclosure is to provide an antibacterial or antiviral polymer filter having improved coating durability for various filter materials including PTFE.

Another object of this disclosure is to provide an antibacterial or antiviral polymer filter having improved UV durability.

Another object of this disclosure is to provide an antibacterial or antiviral polymer filter which may optimize a coating thickness.

Another object of this disclosure is to provide an antibacterial or antiviral polymer filter having excellent aesthetic impression.

Still another object of this disclosure is to provide a method of manufacturing an antibacterial or antiviral polymer filter which allows efficient manufacture of an antibacterial or antiviral polymer filter having improved coating durability and UV durability.

The object of this disclosure is not limited to the objects described above, and other objects that are not stated may be clearly understood from the detailed description.

Technical Solution

In one general aspect, an antibacterial or antiviral filter having improved coating durability and UV durability includes: a polymer filter which is ion beam pretreated to have a surface-modified layer formed thereon so that a coating layer is bound to a polymer surface; and a coating layer of a metal or a metal oxide which is applied on the polymer filter.

According to an exemplary embodiment, the polymer may be polytetrafluoroethylene (PTFE).

According to an exemplary embodiment, the polymer may be polypropylene (PP) or polyethylene terephthalate (PET).

According to an exemplary embodiment, the polymer may be the polymer prepared by one or more of melt-blown and spunbond methods after melt spinning.

According to an exemplary embodiment, the polymer filter may be formed of two or more layers, and the coating layer of a metal or metal oxide may be formed on one or more layers of the polymer filter from outside to inside in the two or more layers of the polymer filter.

According to an exemplary embodiment, the ion beam pretreatment may be a gas ion beam pretreatment including an oxygen gas.

According to an exemplary embodiment, the ion beam pretreatment may be a gas ion beam pretreatment including a hydrogen gas; or an argon gas and a hydrogen gas.

According to an exemplary embodiment, the metal or the metal oxide may be one or more of Cu, $CuO_x$, ZnO, $TiO_2$, Ag, and Au.

According to an exemplary embodiment, the metal or the metal oxide is one or more of Cu, $CuO_x$, ZnO, and $TiO_2$, the antibacterial or antiviral filter has L* of 30 to 60, a* of −2 to 2, and b* of 0 to 10 in accordance with the Lab color space established by International Commission on Illumination (CIE).

According to an exemplary embodiment, the antibacterial or antiviral filter having improved coating durability and UV durability of this disclosure may have an antibacterial activity against one or more of *Staphylococcus aureus* and *Klebsiella pneumoniae*.

According to an exemplary embodiment, the antibacterial or antiviral filter having improved coating durability and UV durability of this disclosure may have an antiviral activity against corona virus.

According to an exemplary embodiment, the antibacterial or antiviral filter having improved coating durability and UV durability of this disclosure may have a function to protect a polymer from ultraviolet rays.

In another general aspect, a product includes the antibacterial or antiviral filter having improved coating durability and UV durability described in this disclosure.

In still another general aspect, a method of manufacturing an antibacterial or antiviral filter having improved coating durability and UV durability includes: i) providing a polymer filter; ii) ion beam pretreating the polymer filter to form a surface-modified layer; and iii) forming a coating layer of a metal or a metal oxide on the surface-modified layer.

According to an exemplary embodiment, in step i), the polymer may be polytetrafluoroethylene (PTFE) and step ii) may include decomposing a CF bond and deriving one or more of a C—C bond and a C—O bond.

According to an exemplary embodiment, in step i), the polymer may include a product prepared by one or more of melt-blown and spunbond methods after melt spinning of polypropylene (PP) or polyethylene terephthalate (PET).

According to an exemplary embodiment, in step ii), the ion beam may irradiate gas particles having an energy of 50 to 1,000 eV.

According to an exemplary embodiment, in step ii), the gas used in the ion beam pretreatment may include an oxygen gas.

According to an exemplary embodiment, in step ii), the gas used in the ion beam pretreatment may include a hydrogen gas; or an argon gas and a hydrogen gas.

According to an exemplary embodiment, in step iii), the metal or the metal oxide may be one or more of Cu, $CuO_x$, ZnO, $TiO_2$, Ag and Au.

Advantageous Effects

According to an exemplary embodiment, the coating durability of the antibacterial or antiviral polymer filter for various filter materials including PTFE may be improved by adjusting ion beam pretreatment conditions.

According to an exemplary embodiment, an antibacterial or antiviral polymer filter having excellent antibacterial or antiviral activity may be provided by forming the polymer filter with a multilayer structure of various materials to improve a particle collection rate.

According to an exemplary embodiment, an antibacterial or antiviral polymer filter having excellent UV durability may be provided by adjusting sputtering conditions of an antiviral material.

According to an exemplary embodiment, a coating thickness of an antibacterial or antiviral polymer filter may be optimized to fit a utilized product by adjusting sputtering conditions of an antimicrobial material. In particular, an antimicrobial filter having excellent coating durability and antimicrobial activity may be provided even with a thin coating thickness.

According to an exemplary embodiment, an antibacterial or antiviral polymer filter having excellent aesthetic impression by adjusting sputtering conditions of an antibacterial agent.

According to an exemplary embodiment, an antibacterial or antiviral polymer filter having improved coating durability may be efficiently manufactured by adjusting ion beam pretreatment and sputtering conditions of an antibacterial agent.

Other objects and advantages of this disclosure will become more apparent from the following detailed description of this disclosure, claims, and drawing.

BRIEF DESCRIPTION OF DRAWINGS

FIG. 7 is a drawing showing results of evaluating antibacterial activity of the antibacterial or antiviral filter according to an exemplary embodiment of this disclosure.

BEST MODE FOR CARRYING OUT THE INVENTION

Figure 1:
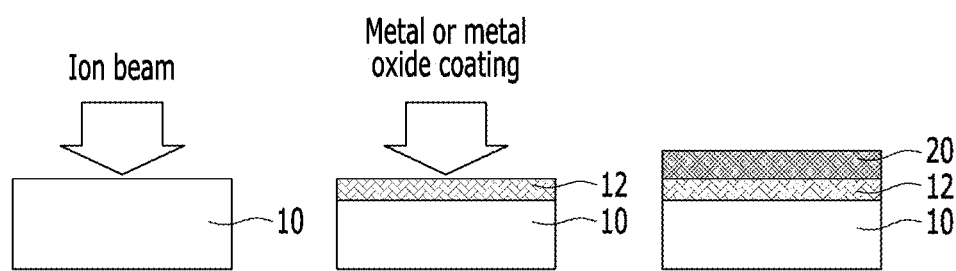
FIG. 1 is a drawing schematically showing a method of manufacturing the antibacterial or antiviral filter according to an exemplary embodiment of this disclosure.

Terms used in this disclosure are used only in order to describe specific exemplary embodiments rather than limiting this disclosure.

Singular forms are intended to include plural forms unless otherwise indicated contextually.

In this disclosure, it will be understood that the terms such as "comprise" or "have" specify the presence of stated features, numerals, steps, operations, constituent elements, parts, or a combination thereof, but do not preclude the presence or addition possibility of one or more other features, numerals, steps, operations, constituent elements, parts, or a combination thereof.

In this disclosure, unless explicitly described to the contrary, a part "comprising" a constituent element will be understood to imply further inclusion of other constituent elements rather than the exclusion of any other constituent elements. In addition, throughout the present specification, being "on" means being positioned in upper or lower portion of a subject part, and does not necessarily mean being positioned on an upper side based on the direction of gravity.

Since this disclosure may be variously modified and have several exemplary embodiments, specific exemplary embodiments will be shown in the drawings and be described in detail in a detailed description. However, it is to be understood that this disclosure is not limited to a specific exemplary embodiment, but includes all modifications, equivalents, and substitutions included the spirit and scope of this disclosure. When it is considered that the detailed description of the related known art in describing this disclosure may obscure the gist of this disclosure, the detailed description thereof will be omitted.

Terms such as "first" and "second" may be used to describe various constituent elements, but the constituent elements are not to be limited to the terms. The terms are used only to distinguish one constituent element from another constituent element.

Hereinafter, exemplary embodiments of this disclosure will be described in detail with reference to the attached drawings, and in describing this disclosure with reference to the attached drawings, identical or corresponding constituent elements are given the same reference number, and repeated description thereof will be omitted.

FIG. 1 is a drawing schematically showing a method of manufacturing the antibacterial or antiviral filter according to an exemplary embodiment of this disclosure.

Figure 2:
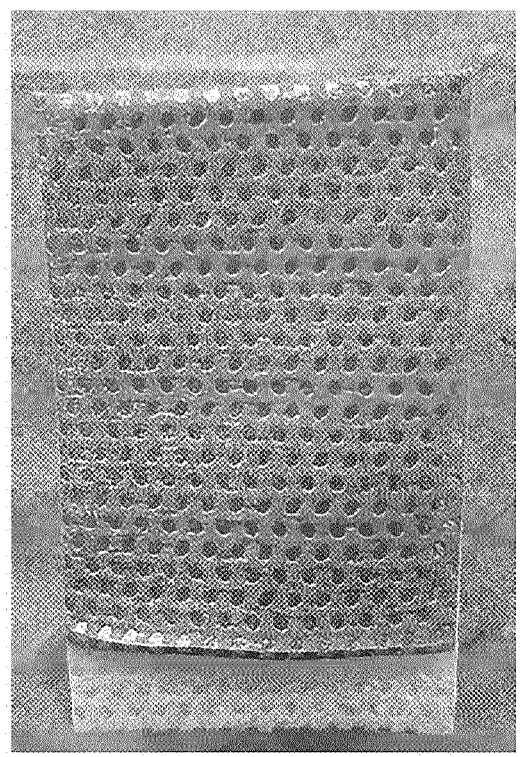
FIG. 2 is a photograph showing the antibacterial or antiviral filter according to an exemplary embodiment of this disclosure.

FIG. 2 is a photograph showing the antibacterial or antiviral filter according to an exemplary embodiment of this disclosure.

Referring to FIGS. 1 and 2, according to an aspect, an antibacterial or antiviral filter having improved coating durability and UV durability including: a polymer filter 10 which is ion beam pretreated to have a surface-modified layer 12 formed thereon so that a coating layer is bound to a polymer surface; and a coating layer 20 of a metal or a metal oxide which is applied on the polymer filter 10, is provided.

The type of polymer is not particularly limited as long as it has the surface-modified layer 12 formed thereon. Without being limited thereto, as the polymer, polypropylene (PP) or polyethylene terephthalate (PET) prepared by one or more of melt-blown and spunbond methods after melt spinning may be appropriate in terms of improving binding strength between a polymer surface and the coating layer 20 of a metal or a metal oxide.

The ion beam pretreatment may be an ion beam pretreatment using various gases. For example, the ion beam pretreatment may use one or more of argon, oxygen, and nitrogen. Without being limited thereto, as the ion beam pretreatment, an ion beam pretreatment including oxygen may be appropriate. The polymer filter 10 which is ion beam pretreated including oxygen may have improved binding strength between the surface-modified layer 12 and the coating layer 20 of a metal or a metal oxide.

According to another aspect, an antibacterial or antiviral filter having improved coating durability and UV durability including: a polymer filter 10 which is ion beam pretreated to have a surface-modified layer 12 formed thereon so that a coating layer is bound to a polymer surface; and a coating layer 20 of a metal or a metal oxide applied on the polymer filter 10, wherein the polymer is polytetrafluoroethylene (PTFE), is provided.

Without being limited thereto, the polytetrafluoroethylene (PTFE) may be expanded PTFE (ePTFE).

PTFE has excellent chemical resistance such as thermal resistance, acid resistance, and alkali resistance, so that it is appropriate for use as an antibacterial or antiviral filter. However, since PTFE is a fluorine-based polymer and generally has very low adhesive strength with most of the coating layers of a metal or a metal oxide, it is important to improve adhesive strength with the coating layer when forming the coating layer of a metal or a metal oxide on a surface of PTFE.

Without being limited thereto, when the polymer is PTFE, gas used in the ion beam pretreatment may be one or more of hydrogen, argon, and helium. Without being limited thereto, as the ion beam pretreatment, a gas ion beam pretreatment including hydrogen may be appropriate for improving binding strength between the surface-modified layer 12 and the coating layer 20 of a metal or a metal oxide, and a gas ion beam pretreatment including hydrogen and argon may be more appropriate.

Without being limited thereto, in the antibacterial or antiviral filter of this disclosure, the polymer filter 10 may be formed of two or more layers. For example, the filter may be formed of spunbond-melt-blown-spunbond, spunbond-melt-blown-melt-blown-spunbond, spunbond-ePTFE-spunbond, and the like. According to the configuration, the antibacterial or antiviral filter of this disclosure, may have an improved particle collection rate to have an improved antibacterial or antiviral function.

Without being limited thereto, the coating layer 20 of a metal or a metal oxide may be formed on one or more layers of the polymer filter 10 from outside to inside in two or more layers of the polymer filter 10. According to the configuration, an antibacterial material is disposed in a portion in contact with outside air, so that the antibacterial or antiviral filter of this disclosure may have an improved particle collection rate to have an effectively improved antibacterial or antiviral function.

The structure of the surface-modified layer 12 is not limited as long as the surface of the polymer filter 10 and the coating layer 20 of a metal or a metal oxide may be bound by the ion beam pretreatment. Therefore, various nanoholes, nanowrinkles, nanodimples, nanoprotrusions, and the like may be formed on the surface-modified layer 12.

The metal or the metal oxide may be one or more of Cu, $CuO_x$, ZnO, $TiO_2$, Ag, and Au having an antibacterial and/or antiviral activity. Without being limited thereto, as the metal or the metal oxide, Cu, $CuO_x$, ZnO, and $TiO_2$ may be appropriate in terms of antimicrobial activity, UV durability, and economic feasibility.

The metal or the metal oxide may be one or more of Cu, $CuO_x$, ZnO, and $TiO_2$, and the antibacterial or antiviral filter of this disclosure may have L* of 30 to 60, a* of −2 to 2, and b* of 0 to 10 in accordance with a Lab color space established by International Commission on Illumination (CIE). When observed with the naked eye, the antibacterial or antiviral filter of this disclosure allows various color implement from a copper or zinc color to a silver color.

Without being limited thereto, the antibacterial or antiviral filter of this disclosure may have an antibacterial activity against one or more of *Staphylococcus aureus* and *Klebsiella pneumoniae*. The *Staphylococcus aureus* is a type of pathogen which is difficult to kill since it causes skin diseases and has resistance to food poisoning bacteria/some antibiotics, but 99.9% eradication is possible when the antibacterial or antiviral filter of this disclosure is used. In addition, the *Klebsiella pneumoniae* is bacteria causing opportunistic infection such as septicemia, pneumonia, urinary tract infection, and soft tissue infection in patients, but 99.9% eradication is possible when the antibacterial or antiviral filter of this disclosure is used.

Without being limited thereto, the antibacterial or antiviral filter of this disclosure may have an antiviral activity against corona virus. In particular, the antibacterial or antiviral filter of this disclosure may have an antiviral activity against SARS-CoV-2. Therefore, when the antibacterial or antiviral filter of this disclosure is applied to masks, splashes may be blocked and corona virus infection may be effectively prevented. In addition, when the antibacterial or antiviral filter of this disclosure is applied to air conditioning equipment or an air cleaner, corona virus is effectively inactivated in multi-use facilities, enclosed space, and the like, thereby effectively preventing spread of corona virus.

The antibacterial or antiviral filter having improved coating durability and UV durability of this disclosure includes the coating layer 20 of a metal or a metal oxide which is applied on the polymer filter 10 adhesively, thereby having a function to protect a polymer from ultraviolet rays. For example, in the case in which the polymer filter 10 is applied to a UV-type air cleaner, air conditioning equipment, and the like, when the polymer filter 10 is exposed to ultraviolet rays, the polymer filter 10 may be damaged by curing of the polymer. Therefore, the antibacterial or antiviral filter having improved coating durability and UV durability of this disclosure includes the coating layer 20 of a metal or a metal oxide which is applied on the polymer filter 10 adhesively, thereby having an antibacterial activity or an antiviral activity and also having UV durability.

According to another aspect, a product including the antibacterial or antiviral filter having improved coating durability and UV durability described in this disclosure is provided. The product includes all products requiring an antibacterial and/or antiviral activity, and for example, may be a mask, an air cleaner, air conditioning equipment, and the like.

Referring to FIG. 1, according to another aspect, a method of manufacturing an antibacterial or antiviral filter having improved coating durability and UV durability including: i) providing a polymer filter 10; ii) ion beam pretreating the polymer filter 10 to form a surface-modified layer 12; and iii) forming a coating layer 20 of a metal or a metal oxide on the surface-modified layer 12, is provided.

Without being limited thereto, in the antibacterial or antiviral filter of this disclosure, the polymer filter 10 may be formed of two or more layers. For example, the filter may be formed of spunbond-melt-blown-spunbond, spunbond-melt-blown-melt-blown-spunbond, spunbond-ePTFE-spunbond, and the like. According to the configuration, the antibacterial or antiviral filter of this disclosure may have an improved particle collection rate to have an improved antibacterial or antiviral function.

Without being limited thereto, the coating layer 20 of a metal or a metal oxide may be formed on one or more layers of the polymer filter 10 from outside to inside in two or more layers of the polymer filter 10. According to the configuration, an antibacterial material is disposed in a portion in contact with outside air, and the antibacterial or antiviral filter of this disclosure have an improved particle collection rate to have an effectively improved antibacterial or antiviral function.

Referring to FIG. 1, according to another aspect, a method of manufacturing an antibacterial or antiviral filter having improved coating durability and UV durability including: i) providing a polymer filter 10; ii) ion beam pretreating the polymer filter 10 to form a surface-modified layer 12; and iii) forming a coating layer 20 of a metal or a metal oxide on the surface-modified layer 12, wherein the polymer is polytetrafluoroethylene (PTFE), and in step ii), a CF bond is decomposed and one or more of a C—C bond and a C—O bond is derived, is provided.

Step i) is a step of providing the polymer filter 10 requiring an antibacterial and antiviral activity.

Step ii) is a step of performing an ion beam pretreatment to form the surface-modified layer 12 on the polymer filter 10. The ion beam pretreatment may be an ion beam pretreatment of various gases. For example, the ion beam pretreatment may use one or more of argon, oxygen, hydrogen, nitrogen, and helium. Without being limited thereto, when the polymer is prepared by one or more of melt-blown and spunbond methods after melt spinning of polypropylene (PP) or polyethylene terephthalate (PET), a gas ion beam pretreatment including oxygen may be appropriate as the ion beam pretreatment. The polymer filter 10 which is gas ion beam pretreated including oxygen may have improved binding strength between the surface-modified layer 12 and the coating layer 20 of a metal or a metal oxide.

Without being limited thereto, when the polymer is PTFE, gas used in the ion beam pretreatment may be one or more of hydrogen, argon, and helium. Without being limited thereto, as the ion beam pretreatment, a gas ion beam pretreatment including hydrogen may be appropriate. The gas ion beam pretreated polymer filter 10 including hydrogen may be appropriate for improving binding strength between the surface-modified layer 12 and the coating layer 20 of a metal or a metal oxide, and a gas ion beam pretreatment including hydrogen and argon may be more appropriate.

In step ii), the ion beam may irradiate gas particles having an energy of 50 to 1,000 eV. As the ion beam, irradiation of gas particles having an energy of 50 to 1,000 eV is appropriate, since the surface-modified layer 12 of the polymer filter 10 is easily formed and the binding strength between the surface of the polymer filter 10 and the coating layer 20 of a metal or a metal oxide may be improved by means of the surface-modified layer 12, and the ion beam energy may be more appropriately 50 to 800 eV, the ion beam energy may be more appropriately 100 to 800 eV, the ion beam energy may be still more appropriately 300 to 800 eV, and the ion beam energy may be still more appropriately 300 to 600 eV. Without being limited thereto, when gas particles having an energy of less than 50 eV are irradiated as the ion beam, a surface modification effect may be insignificant, and when gas particles having an energy or more than 1,000 eV, a polymer substrate may be deformed.

Step iii) is a step of forming a coating layer 20 formed of a metal or a metal oxide on the surface-modified layer 12. Without being limited thereto, when the coating layer 20 of a metal or a metal oxide is formed by a sputtering or evaporation method, the coating layer 20 of a metal or a metal oxide may be uniformly efficiently formed.

In step iii), the metal or the metal oxide is not particularly limited as long as it has an antibacterial activity and/or antiviral activity. Without being limited thereto, in step iii), the metal or the metal oxide may be one or more of Cu, $CuO_x$, ZnO, $TiO_2$, Ag, and Au.

EXAMPLES

Hereinafter, this disclosure will be described in more detail, by the specific examples and the comparative examples of this disclosure, and the results of characteristic evaluation thereof.

1. Analysis of Changes in Thickness and Surface Color of Copper Oxide Deposited Film Depending on Sputtering Conditions after Ion Beam Pretreatment 1) Ion Beam Pretreatment A melt-blown (MB) polypropylene (PP) fabric was ion beam pretreated under the following fixed conditions:

$$O_2/600 \text{ V}/100 \text{ mA}/10 \text{ mm/s} \times 10 \text{ times}$$

2) Cu Sputtering

As shown in the following Table 1, the ion beam pretreated melt-blown (MB) polypropylene (PP) fabric was Cu-sputtered while sputtering conditions were changed.

TABLE 1

|  | #1 | #2 | #3 | #4 | #5 |
|---|---|---|---|---|---|
| Gas type | Ar 70 sccm | Ar 70, $O_2$ 1 sccm | Ar 70, $O_2$ 3 sccm | Ar 70, 5 sccm | Ar 70, $O_2$ 10 sccm |
| Power | S#1 500 V/0.4 A | S#1 499 V/0.31 A | S#1 501 V/0.23 A | S#1 498 V/0.14 A | S#1 497 V/0.1 A |
|  | S#2 465 V/0.4 A | S#2 475 V/0.3 A | S#2 475 V/0.2 A | S#2 450 V/0.2 A | S#2 465 V/0.2 A |
| Moving speed | 14 mm/s × twice | 14 mm/s × twice | 14 mm/s × twice | 14 mm/s × twice | 14 mm/s × twice |
| Deposition thickness | 45.4 nm | 34.9 nm | 32.2 nm | 21.6 nm | 16.4 nm |

As shown in Table 1, as an oxygen gas flow rate was increased in Cu sputtering deposition, $CuO_x$ was thinly formed. Therefore, when Cu sputtering was deposited on a filter, the oxygen gas flow rate was adjusted to fit the use of the filter, thereby optimizing the thickness of the copper coating layer.

Figure 3:
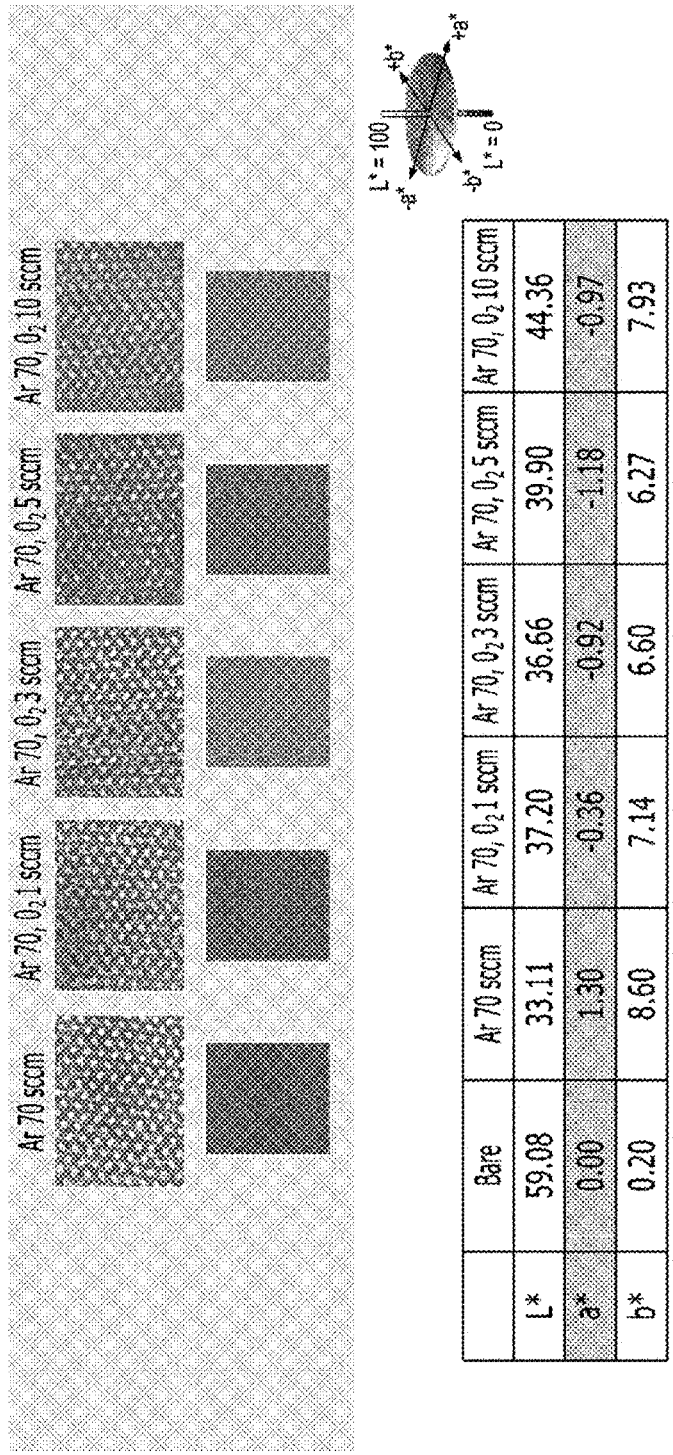
FIG. 3 is a drawing showing a surface color of a copper oxide depending on sputtering conditions after the ion beam pretreatment according to an exemplary embodiment of this disclosure.

FIG. 3 is a drawing showing a surface color of a copper oxide depending on the sputtering conditions after the ion beam pretreatment according to an exemplary embodiment of this disclosure.

Referring to Table 1 and FIG. 3, as an oxygen gas flow rate was increased in cupper sputtering deposition, copper oxidation was increased to change the color from a copper color to a silver color. Therefore, the oxygen gas flow rate was adjusted in copper sputtering deposition, and it was confirmed that a coating layer color may be optimized to fit the use of the filter, and aesthetic sense may be enhanced.

2. Analysis of Adhesive Strength of Copper Oxide Deposited Film Depending on Presence or Absence of Ion Beam Pretreatment and Sputtering Conditions after Ion Beam Pretreatment The adhesive strength of a copper oxide deposited film was evaluated by a peeling degree of the coating layer when a 3M tape (Scotch Magic Tape 810) was applied to the surface of a mask coated with a copper oxide, rubbed, and then detached.

Figure 4:
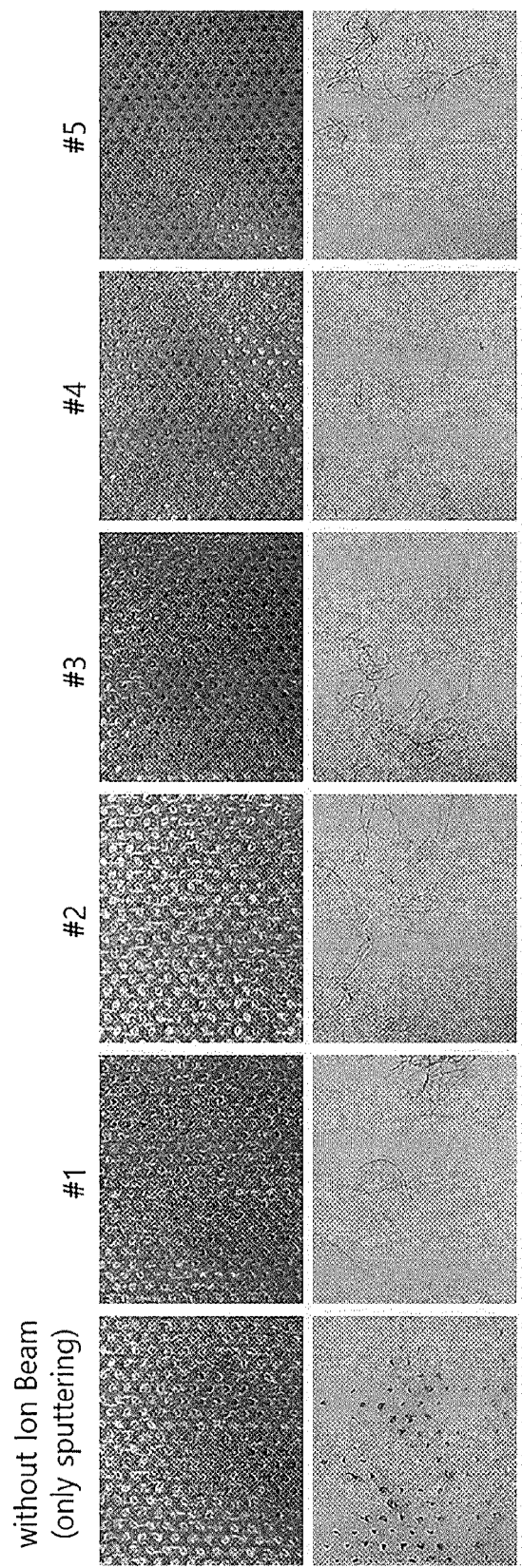
FIG. 4 is a drawing showing results of evaluating adhesive strength of a copper oxide deposited film depending on the presence or absence of ion beam pretreatment and sputtering conditions after the ion beam pretreatment according to an exemplary embodiment of this disclosure.

The results are shown in FIG. 4. That is, FIG. 4 is a drawing showing results of evaluating adhesive strength of a copper oxide deposited film depending on the presence or absence of the ion beam pretreatment and the sputtering conditions after the ion beam pretreatment.

Referring to FIG. 4, in a mask coated with the copper oxide which was not ion beam pretreated, it was observed that the coating layer was peeled off from a mask fabric. Meanwhile, in a mask coated with the copper oxide after the ion beam pretreatment, it was observed that a mask fiber came off and the coating layer did not come off. Therefore, it represents that the adhesive strength of the coated deposited film is stronger than the durability of the mask fiber.

3. Analysis of Fiber of Disposable Mask Produced by Roll-to-Roll after being Ion Beam Pretreated and then Cu-Sputtered The fiber of a disposable mask fiber which was produced by roll-to-roll after the ion beam pretreatment and then being coated with Cu at a thickness of 20 nm by Cu sputtering under the following conditions was analyzed by FE-SEM:

$$\text{Cu sputtering (roll-to-roll)/Ar}$$

$$200 \text{ sccm}/1 \text{ kW}/562 \text{ V}/2.97 \text{ A}/1 \text{ mpm} * \text{once}$$

Figure 5:
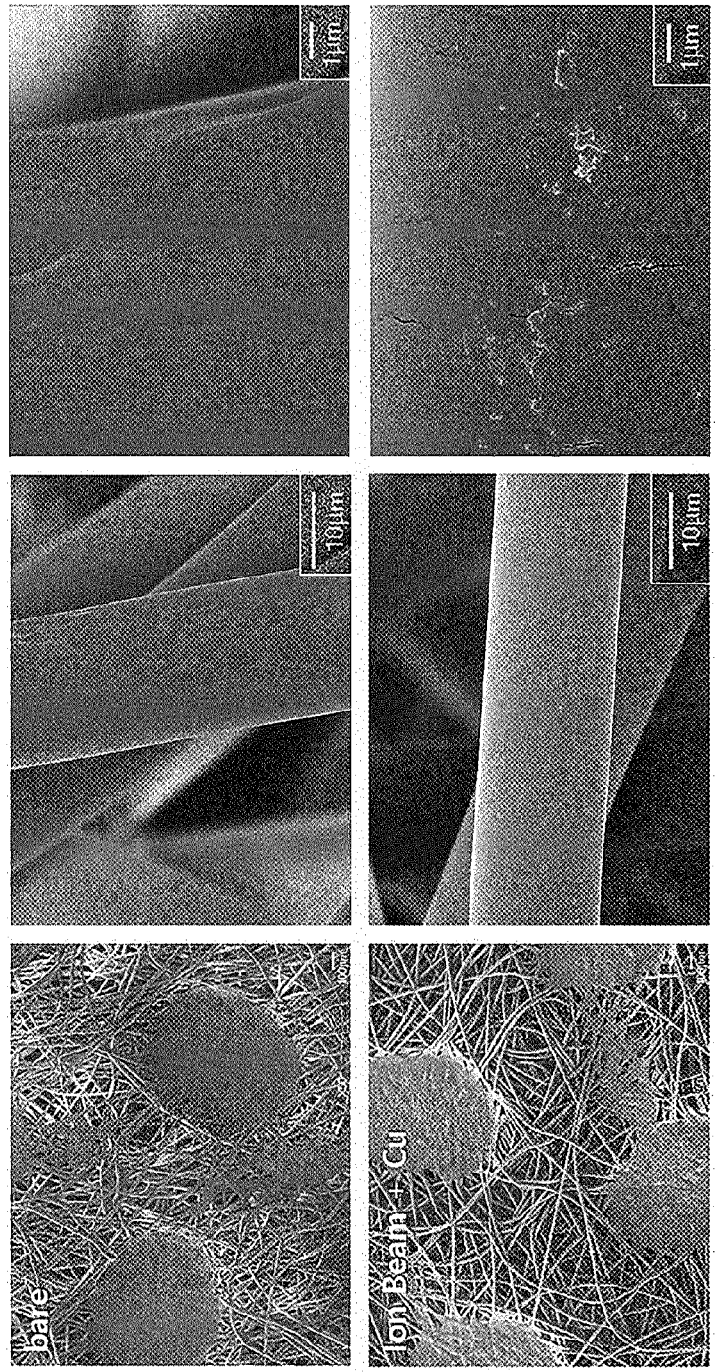
FIG. 5 is a FE-SEM photograph of a mask fiber surface on which a $CuO_x$ metal oxide is deposited after the ion beam pretreatment according to an exemplary embodiment of this disclosure.

FIG. 5 is a FE-SEM photograph of a mask fiber surface on which a $CuO_x$ metal oxide is deposited after the ion beam pretreatment according to an exemplary embodiment of this disclosure.

Referring to FIG. 5, it is shown that the fiber surface of the mask on which a $CuO_x$ metal oxide was deposited after the ion beam pretreatment according to this disclosure was not damaged at all even with the roll-to-roll process production.

Figure 6:
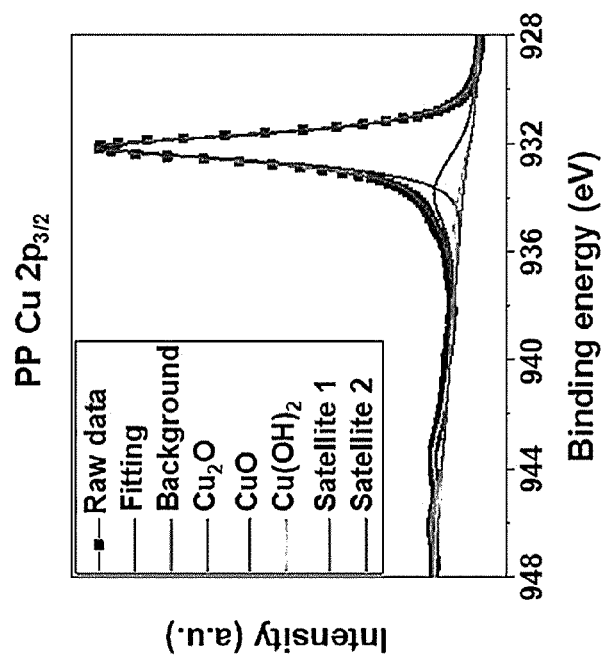
FIG. 6 is a drawing of XPS analysis results showing an oxidation state of a $CuO_x$ thin film deposited on a disposable mask according to an exemplary embodiment of this disclosure.

FIG. 6 is a drawing of XPS analysis results showing an oxidation state of a $CuO_x$ thin film deposited on a disposable mask according to an exemplary embodiment of this disclosure.

Referring to FIG. 6, it is shown that the sputtering deposition Cu thin film on a PP fiber surface had about 75% of $Cu_2O$ and about 25% of CuO.

4. Analysis of Antibacterial Activity of Disposable Mask which was Ion Beam Pretreated and then Cu Sputtered The antibacterial activity against *Staphylococcus aureus* and *Klebsiella pneumoniae* was analyzed for the fiber of a disposable mask which was ion beam pretreated and then coated with Cu at a thickness of 20 nm by Cu sputtering under the following conditions. The results are shown in FIG. 7.

$$\text{Cu sputtering (surface treatment equipment)/Ar 75 sccm}$$

$$(\text{chamber})/S\#1\ 500\ \text{V},\ 0.4\ \text{A}/S\#2\ 465\ \text{V},\ 0.4\ \text{A}/16\ \text{mm/s} * \text{once}$$

That is, FIG. 7 is a drawing showing results of evaluating antibacterial activity of the antibacterial or antiviral filter according to an exemplary embodiment.

As shown in FIG. 7, the mask according to this disclosure showed an antibacterial activity of 99.9% against *Staphylococcus aureus* and *Klebsiella pneumoniae*, unlike a normal mask.

5. Analysis of Antiviral Activity of Disposable Mask which was Ion Beam Pretreated and then Cu Sputtered The COVID-19 virus inactivation was analyzed for the fiber of a disposable mask which was ion beam pretreated and then coated with Cu at a thickness of 20 nm by Cu sputtering under the following conditions.

Cu sputtering (roll-to-roll)/Ar 200 sccm/1 kW/562 V/2.97 A/1 mpm*once

The materials and method used in the analysis of antiviral activity at this time are as follows:
Vero cell
SARS-CoV-2: NCCP43328 virus $10^{-5}$ 200 ul per well ($2\times10^5$ cell per 6 well plate)
nCOVID19 Detection reagent: STANDARD M nCOV Real-Time PCR (SD BIOSCIENCE)
Filter (Bare, PP which was ion beam treated and then copper deposited) pretreated for 1 hour The Vero cell was infected with SARS-CoV 2 clinical isolate NCCP43328 1 hour before adding the PP filter at a fixed time. Samples were taken two days after the infection, and the amount of virus was measured using real-time PCR of cell-related virus. The real-time analysis was performed on virus-infected cells using a probe for RdRp genes and E genes.

Figure 8:
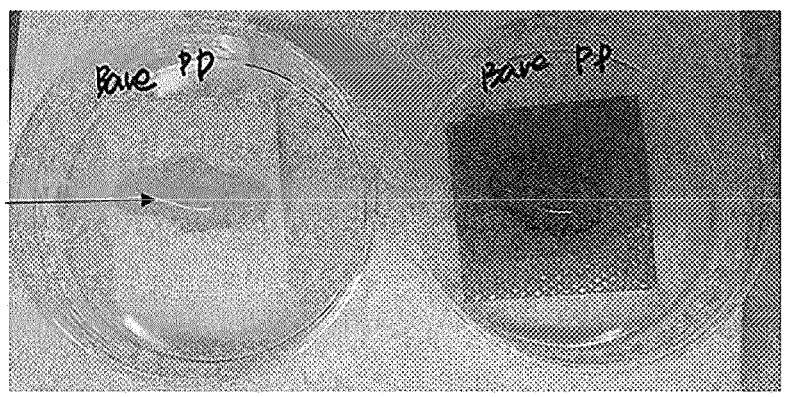
FIG. 8 is a photograph of an experiment for evaluating COVID-19 virus inactivation of the antibacterial or antiviral filter according to an exemplary embodiment of this disclosure.
Figure 9:
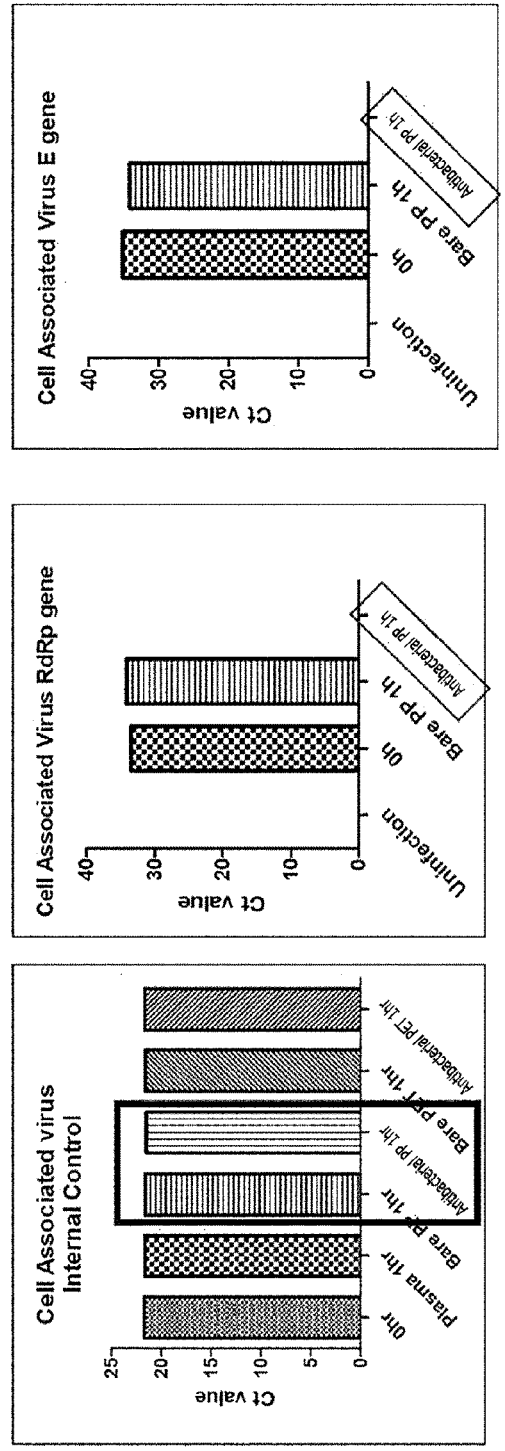
FIG. 9 is a graph showing results of evaluating COVID-19 virus inactivation of the antibacterial or antiviral filter according to an exemplary embodiment of this disclosure.

The results are shown in FIGS. 8 and 9. FIG. 8 is a photograph of an experiment for evaluating COVID-19 virus inactivation of the antibacterial or antiviral filter according to an exemplary embodiment of this disclosure. FIG. 9 is a graph showing results of evaluating COVID-19 virus inactivation of the antibacterial or antiviral filter according to an exemplary embodiment of this disclosure.

As shown in FIG. 9, the mask according to an exemplary embodiment of this disclosure may completely inactivate COVID-19 virus.

6. Analysis of UV Durability of Polymer Filter which was Ion Beam Pretreated and then Cu Sputtered After the ion beam pretreatment with mixed gas of argon and oxygen in a range of an ion beam energy of 0.3 to 0.6 keV was performed on the surface of melt-blown PP and spunbond PP filters, and then a copper deposited layer at a thickness of 50 nm was formed by Cu sputtering. Thereafter, in order to evaluate the UV durability, ultraviolet rays at a wavelength of 253 nm were irradiated on the entire area of the filter at a total power of about 4 W for 30 hours.

Figure 10:
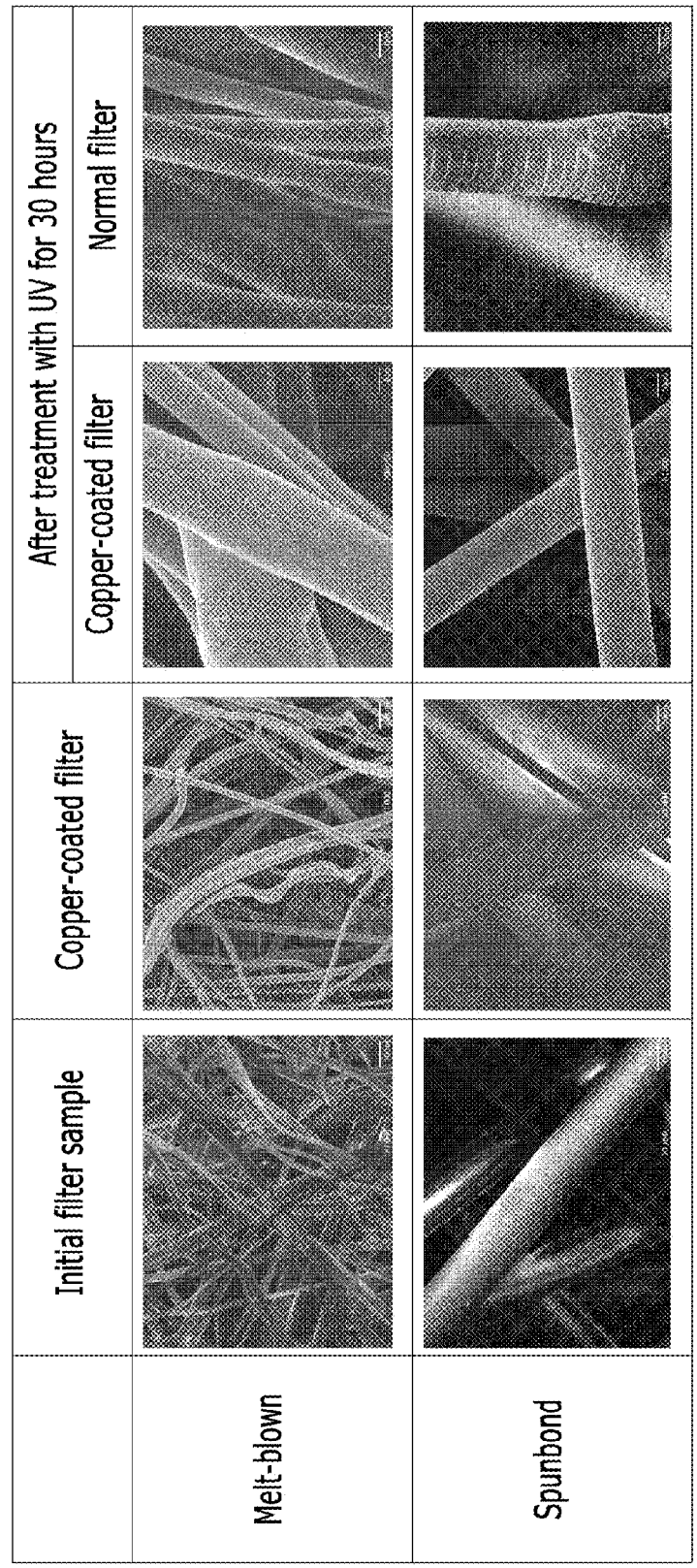
FIG. 10 is an SEM photograph after a UV treatment of a Cu thin film deposited melt-blown and spunbond polymer filter of the antibacterial or antiviral filter according to an exemplary embodiment of this disclosure.

FIG. 10 is an SEM photograph after a UV treatment of a Cu thin film deposited melt-blown and spunbond polymer filter of the antibacterial or antiviral filter according to an exemplary embodiment of this disclosure.

Referring to FIG. 10, the melt-blown and spunbond PP filters which were not copper deposited were damaged by ultraviolet rays to have winkles, but the copper deposited melt-blown and spunbond PP filters were observed to have less damaged areas by ultraviolet rays.

Therefore, it was confirmed that when the ion beam pretreatment and then metal deposition were performed on the surface of the polymer filter, the UV durability of the filter was improved.

7. Analysis of UV Durability of Polymer Filter which was Ion Beam Pretreated and then $TiO_2$ Sputtered After the ion beam pretreatment in a range of an ion beam energy of 0.3 to 0.6 keV was performed on the surface of melt-blown PP and spunbond PP filters, a $TiO_2$ deposited layer at a thickness of 50 nm was formed by $TiO_2$ sputtering.

$TiO_2$ sputtering/Ar 40 sccm, $O_2$ 10 sccm/DC 200 W/0.6 mpm*80 times

Thereafter, ultraviolet rays at a wavelength of 253.7 nm were irradiated on the entire area of the filter at a total power of 3.4 W for 132 hours to perform an evaluation test of the UV durability of the polymer filter.

Figure 11:
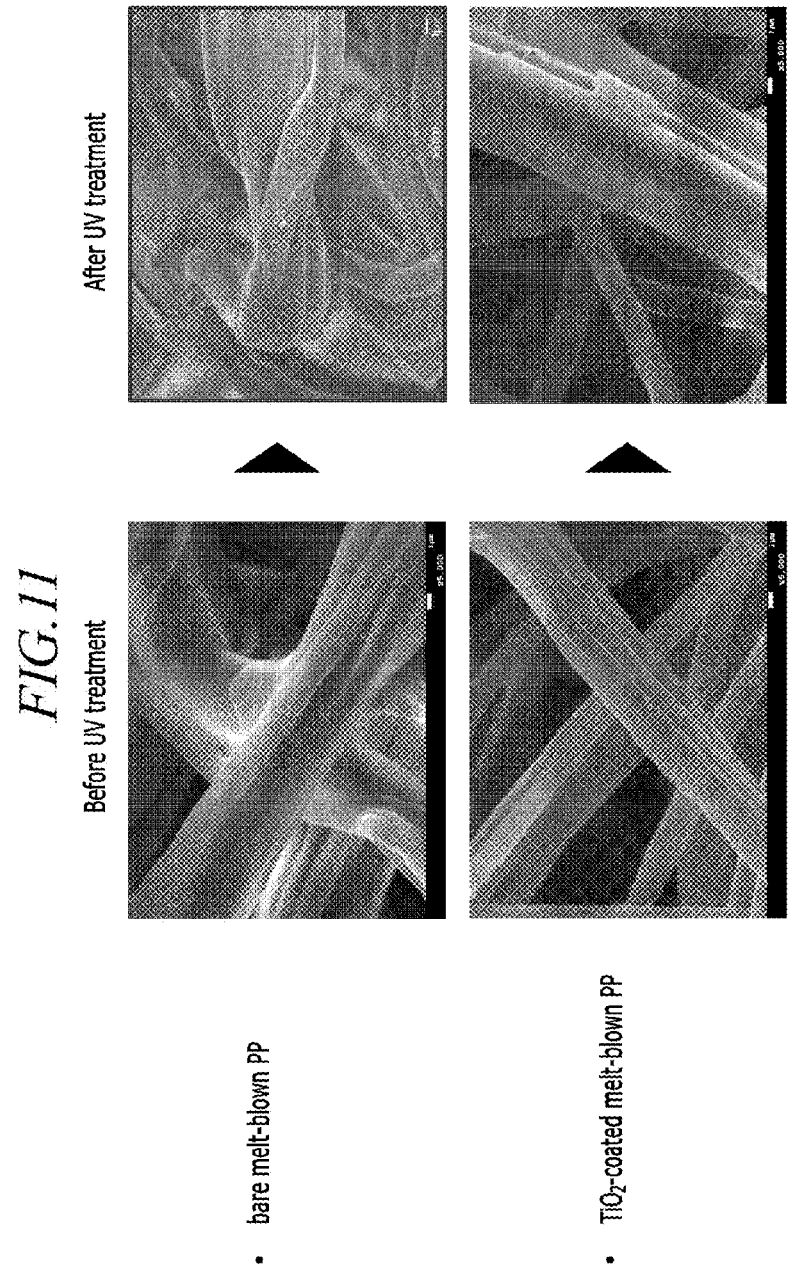
FIG. 11 is a FE-SEM photograph before and after a UV treatment of a $TiO_2$ deposited melt-blown polymer filter according to an exemplary embodiment of this disclosure.
Figure 12:
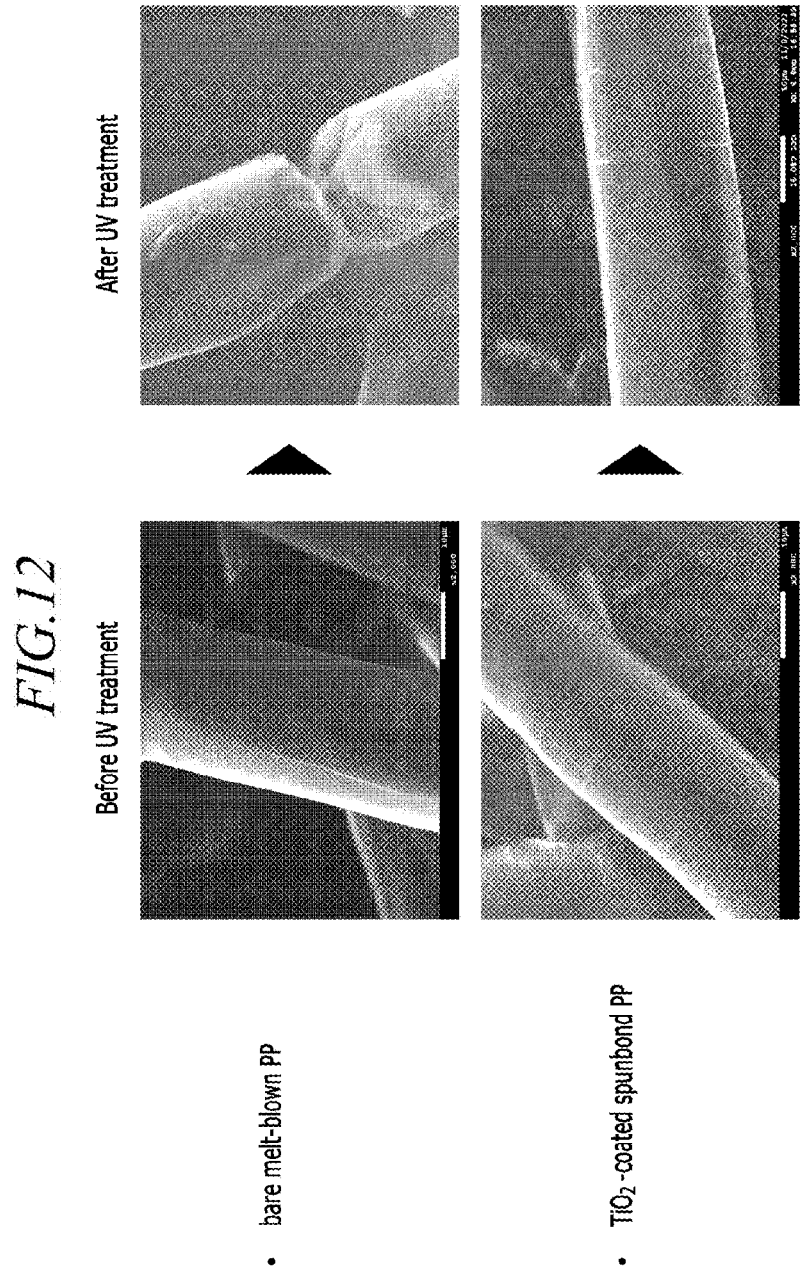
FIG. 12 is a FE-SEM photograph before and after a UV treatment of a $TiO_2$ deposited spunbond polymer filter according to an exemplary embodiment of this disclosure.

FIG. 11 is a FE-SEM photograph before and after a UV treatment of a $TiO_2$ deposited melt-blown polymer filter according to an exemplary embodiment of this disclosure.
FIG. 12 is a FE-SEM photograph before and after a UV treatment of a $TiO_2$ deposited spunbond polymer filter according to an exemplary embodiment of this disclosure.

Referring to FIGS. 11 and 12, it is observed that the melt-blown and spunbond PP filters which were not $TiO_2$ deposited were damaged by ultraviolet rays, but the $TiO_2$ deposited melt-blown and spunbond PP filters had almost no damaged area by ultraviolet rays.

Figure 13:
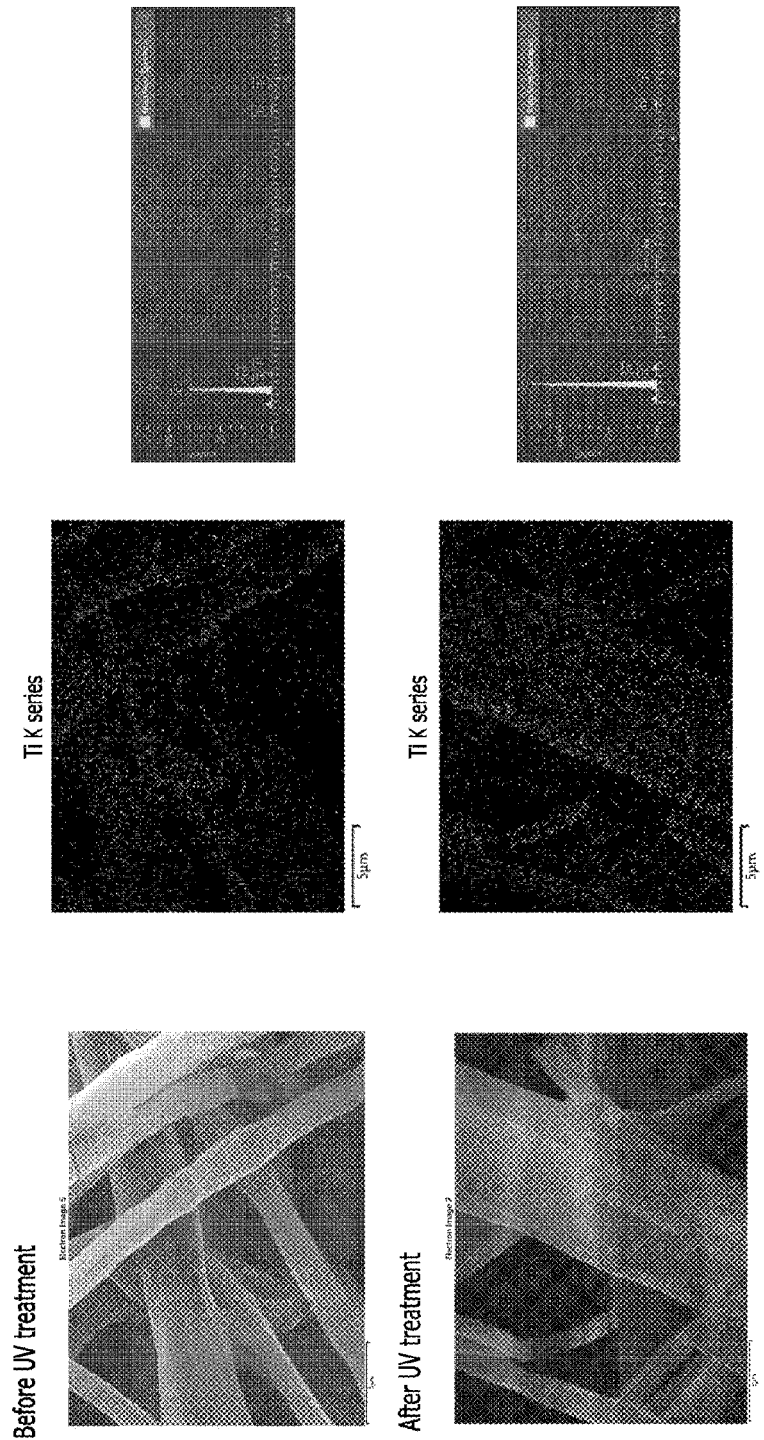
FIG. 13 shows EDS analysis results before and after a UV treatment of the $TiO_2$ deposited melt-blown polymer filter according to an exemplary embodiment of this disclosure.
Figure 14:
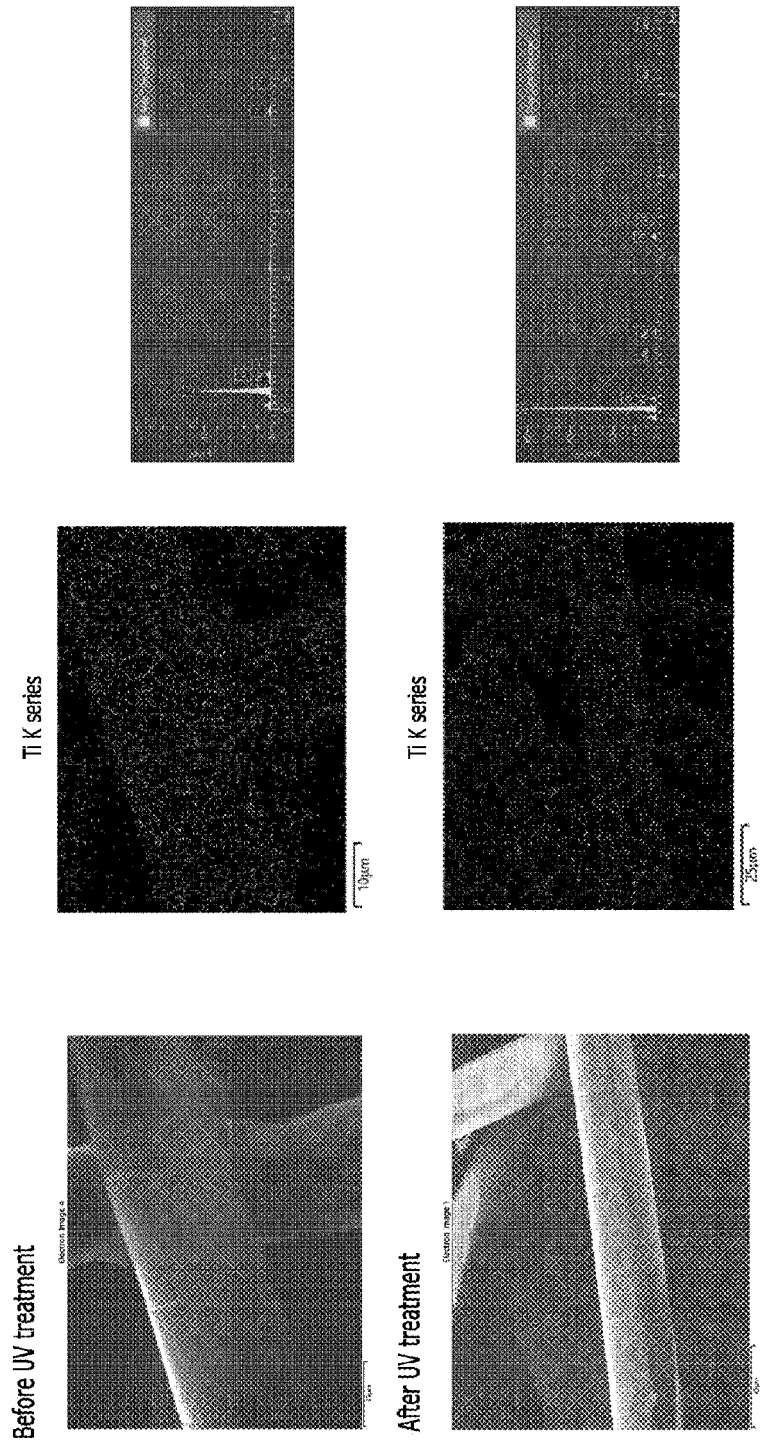
FIG. 14 shows EDS analysis results before and after a UV treatment of the $TiO_2$ deposited spunbond polymer filter according to an exemplary embodiment of this disclosure.

FIG. 13 shows EDS analysis results before and after a UV treatment of the $TiO_2$ deposited melt-blown polymer filter according to an exemplary embodiment of this disclosure.
FIG. 14 shows EDS analysis results before and after a UV treatment of the $TiO_2$ deposited spunbond polymer filter according to an exemplary embodiment of this disclosure.

Referring to FIGS. 13 and 14, it is confirmed that the $TiO_2$ deposited melt-blown and spunbond PP filters had coating remaining on the surface even after UV treatment, in contrast with the filter which was not $TiO_2$ deposited.

Therefore, it was confirmed that when the ion beam pretreatment and then metal oxide deposition were performed on the surface of the polymer filter, the UV durability of the filter was improved.

8. Analysis of Adhesive Strength of PTFE Filter which was Ion Beam Pretreated and then Cu Sputtered The ion beam pretreatment was performed on the surface of PP/ePTFE (Typar 3161L/Teratex) and ePTFE (Teratex) filters under the following fixed conditions, and a copper deposited layer at a thickness of 350 nm was formed by Cu sputtering. Thereafter, peeling off evaluation was performed using a Scotch 810 tape for adhesive strength analysis.

$H_2$/0.07 kV/37 mA/0.1 mpm*twice

Figure 15:
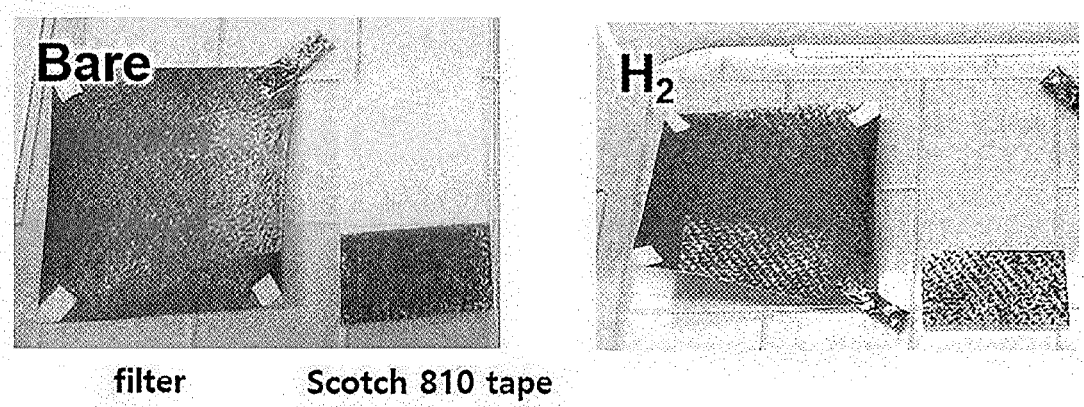
FIG. 15 is a drawing showing adhesive strength evaluation of a deposited film of an ePTFE filter according to an exemplary embodiment of this disclosure.

FIG. 15 is a drawing showing adhesive strength evaluation of a deposited film of an ePTFE filter according to an exemplary embodiment of this disclosure.

Referring to FIG. 15, it is confirmed that when a Scotch 810 tape was applied on an ePTFE filter which was copper deposited without the ion beam pretreatment and then peeled off, a large amount of copper came off, but when a Scotch 810 tape was applied on an ePTFE filter which was ion beam pretreated and then copper deposited and then peeled off, a smaller amount of copper came off.

Therefore, it was confirmed that the adhesive strength between the filter and the metal deposited layer was improved when the ion beam pretreatment and then metal deposition were performed on the surface of the PTFE filter.

9. Analysis of Water Contact Angle of PTFE Film which was Ion Beam Pretreated and then Cu Sputtered FIG. 16 shows the results of evaluating a water contact angle of a PTFE film by process gas according to an exemplary embodiment of this disclosure.

Figure 16:
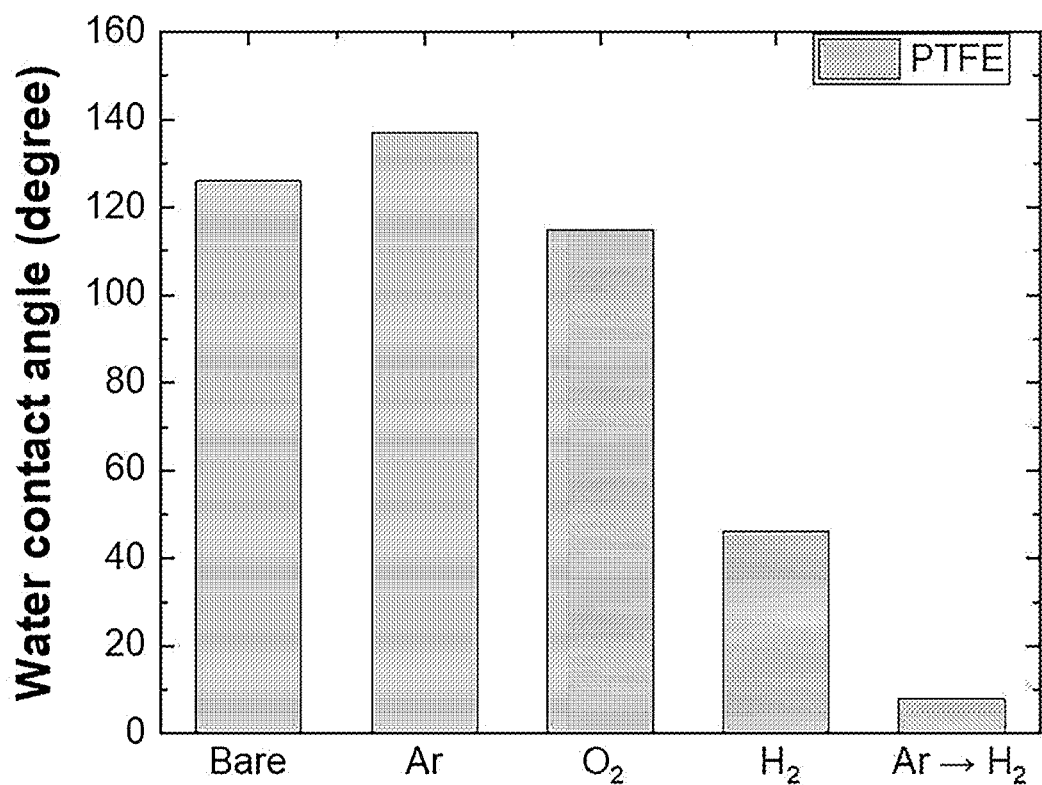
FIG. 16 is a graph showing results of evaluating a water contact angle of a PTFE film by process gas according to an exemplary embodiment of this disclosure.

Referring to FIG. 16, when the argon and hydrogen gas ion beam pretreatment was performed on the PTFE film, the water contact angle was less than 10°, and when the hydrogen gas ion beam pretreatment was performed, the water contact angle was 50° or less. This shows significantly excellent results as compared with the results of the water contact angle when argon gas ion beam and oxygen gas ion beam pretreatment was performed.

Therefore, it was confirmed that the adhesive strength between the film and the metal layer may be improved when the ion beam pretreatment including hydrogen and then metal deposition were performed on the surface of the PTFE film, and according to the results, the PTFE filter of the same material may be also expected to have improved adhesive strength with a metal layer when being ion beam pretreated including hydrogen.

Hereinabove, though an exemplary embodiment of this disclosure has been described, those skilled in the art will make various modifications and variations of this disclosure by addition, change, deletion, or supplement of constituent elements, within the scope without departing from the spirit of this disclosure as set forth in the claims, and this will be also included within the right scope of this disclosure.

DESCRIPTION OF REFERENCE NUMERALS

10: polymer filter
12: surface modified layer
20: coating layer

The invention claimed is:

1. An antibacterial or antiviral filter having improved coating durability and UV durability comprising:
   a polymer filter having a surface-modified layer formed by irradiating the surface with an ion beam of a hydrogen gas or a hydrogen/argon mixed gas at an ion energy of 300 eV to 800 eV; and
   a coating layer of CuOx or $TiO_2$ deposited on the surface-modified layer by sputtering,
   wherein the surface-modified layer has a water contact angle of 50 degrees or less.

2. The antibacterial or antiviral filter having improved coating durability and UV durability of claim 1, wherein the polymer is polytetrafluoroethylene (PTFE).

3. The antibacterial or antiviral filter having improved coating durability and UV durability of claim 1, wherein the polymer is polypropylene (PP) or polyethylene terephthalate (PET).

4. The antibacterial or antiviral filter having improved coating durability and UV durability of claim 1, wherein the polymer is the polymer prepared by one or more of melt-blown and spunbond methods after melt spinning.

5. The antibacterial or antiviral filter having improved coating durability and UV durability of claim 1, wherein the polymer filter is formed of two or more layers, and the coating layer is formed on an outer surface of at least an outermost layer in the one or more layers of the polymer filter.

6. The antibacterial or antiviral filter having improved coating durability and UV durability of claim 1, wherein the antibacterial or antiviral filter has L* of 30 to 60, a* of −2 to 2, and b* of 0 to 10 in accordance with a Lab color space established by International Commission on Illumination (CIE).

7. The antibacterial or antiviral filter having improved coating durability and UV durability of claim 1, wherein the antibacterial or antiviral filter has an antibacterial activity against one or more of *Staphylococcus aureus* and *Klebsiella pneumoniae*.

8. The antibacterial or antiviral filter having improved coating durability and UV durability of claim 1, wherein the antibacterial or antiviral filter has an antiviral activity against corona virus.

9. The antibacterial or antiviral filter having improved coating durability and UV durability of claim 1, wherein the antibacterial or antiviral filter has a function to protect a polymer from ultraviolet rays.

10. A product comprising the antibacterial or antiviral filter having improved coating durability and UV durability of claim 1.

* * * * *